(No Model.) 2 Sheets—Sheet 1.
D. C. RUTH.
BAND CUTTER AND FEEDER FOR THRASHING MACHINES.
No. 524,267. Patented Aug. 7, 1894.
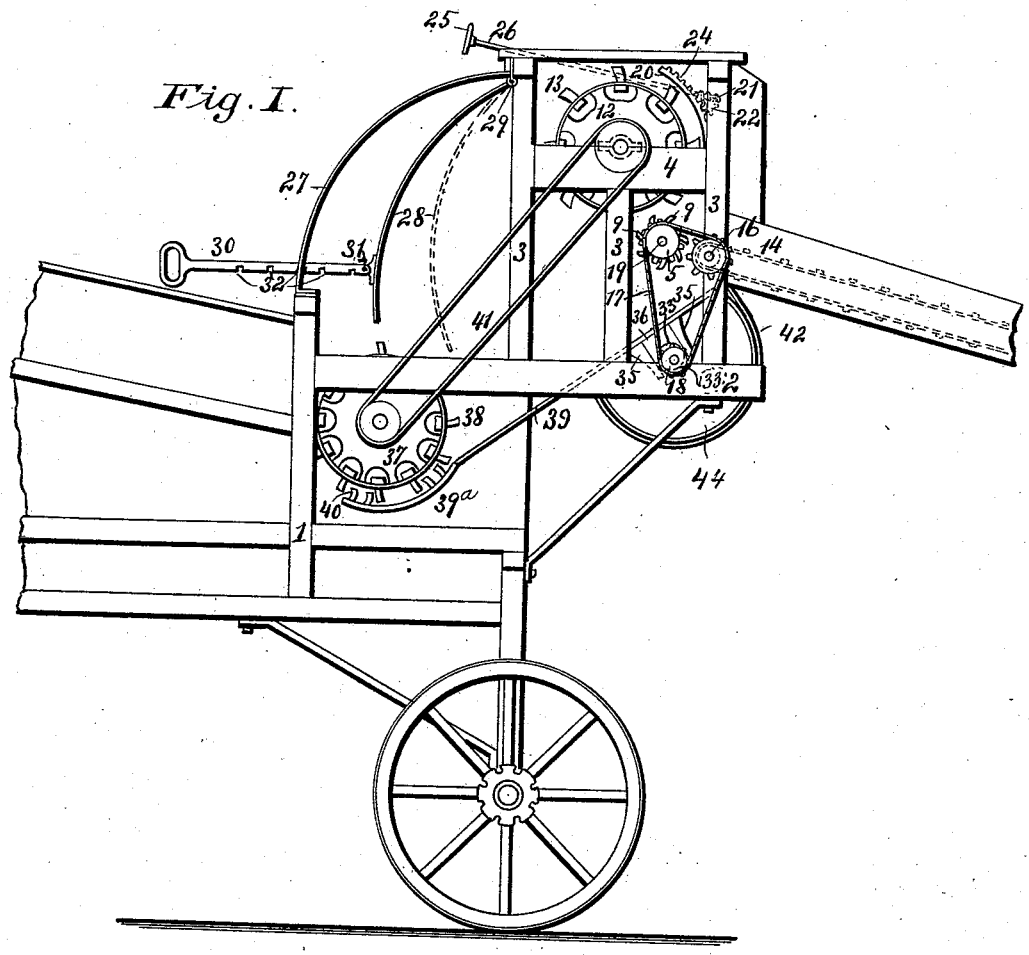
Fig. I.
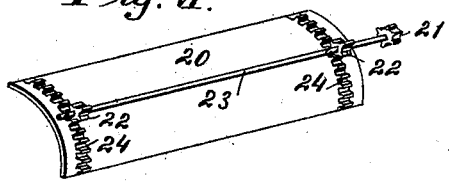
Fig. VI.
Witnesses:
F. G. Fischer
May Fields
Inventor:
David C. Ruth
By Knight Bros
Attys.

(No Model.) 2 Sheets—Sheet 2.
D. C. RUTH.
BAND CUTTER AND FEEDER FOR THRASHING MACHINES.
No. 524,267. Patented Aug. 7, 1894.
Fig. II.
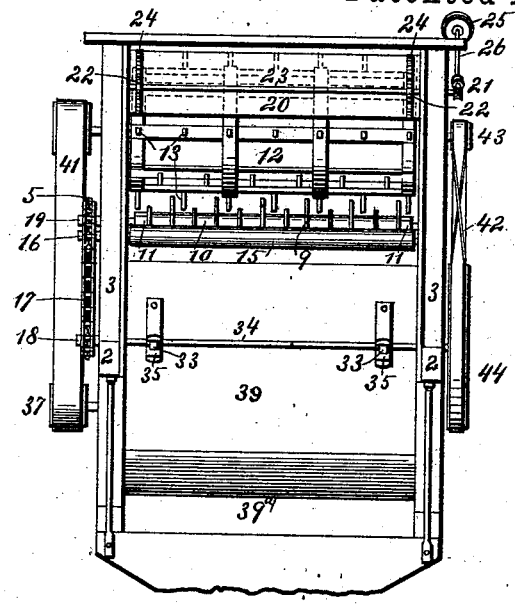
Fig. III.
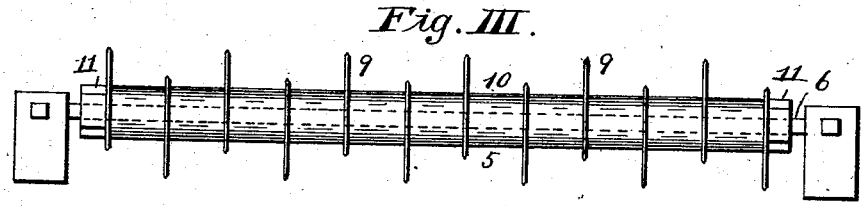
Fig. IV.
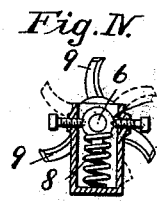
Fig. V.
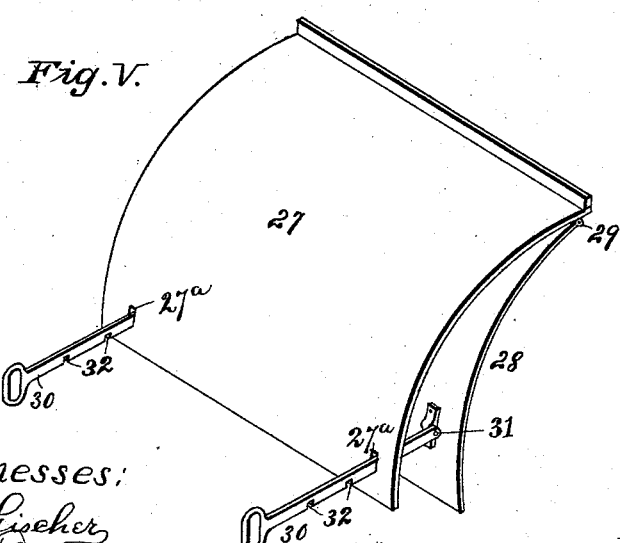
Witnesses:
J. G. Fischer
Jay Fields
Inventor:
David C. Ruth
By Knight Bros
Attys.
THE NORRIS PETERS CO., PHOTO-LITHO., WASHINGTON, D. C.

UNITED STATES PATENT OFFICE.

DAVID C. RUTH, OF HALSTEAD, KANSAS.

BAND-CUTTER AND FEEDER FOR THRASHING-MACHINES.

SPECIFICATION forming part of Letters Patent No. 524,267, dated August 7, 1894.

Application filed December 4, 1893. Serial No. 492,745. (No model.)

*To all whom it may concern:*

Be it known that I, DAVID C. RUTH, a citizen of the United States, and a resident of Halstead, in the county of Harvey and State of Kansas, have invented certain new and useful Improvements in Band-Cutters and Feeders for Thrashing-Machines, of which the following is a full, clear, and exact description, reference being had to the accompanying drawings, which form a part of this specification.

My invention relates to certain new and useful improvements in band-cutters and feeders for thrashing machines and my invention consists in certain features of novelty hereinafter described and pointed out in the claims.

Figure I is a side elevation of the front part of a thrashing-machine the panels being omitted, showing the location and the relative position of the parts. Fig. II is a front view looking directly into the machine. Fig. III is a detail view of my improved band-cutter. Fig. IV is an end view of the same, showing the relation to each other of the knives, and also my improved means for pivoting the shaft. Fig. V shows my improved shield for directing the grain from the feeder cylinder to the thrashing cylinder. Fig. VI shows my improved adjustable plate for regulating the feed supply.

Numerals refer to similar parts throughout the several views.

1 is the thrashing-machine frame.

2 are sills supporting the band-cutter and feeder frame, which consists of the posts 3 and the girts 4.

5 is the band-cutter, the shaft 6 of which has journal bearings 7, as shown in Fig. IV.

9 are the knives of the band-cutter each blade consisting of three or any number of knives arranged on the shaft 6, in alternate order as shown by dotted lines in Fig. IV, and is separated by the collars 10 and held securely in position by the nuts 11.

12 is the feeder cylinder journaled on the girts 4 and provided with spikes 13.

14 is a carrier belt to convey the grain into the feeder and over the band-cutter.

15 is the drum over which the carrier travels. It is operated by the sprocket wheel 16, through the sprocket-chain 17, passing around the sprocket pulley 18. The sprocket-chain 17, also gives motion to the band-cutter through the sprocket wheel 19, on the band-cutter shaft.

20 is the feeder plate to regulate the amount of grain supplied to the feeder. It is operated by the worm wheel 21, through the cog-wheels 22, located on the shaft 23, engaging the cog-sectors 24 and operated by the hand-wheel 25 on the shaft 26.

27 is the casing which, with the panels forms the covering of the machine.

28 is a shield pivoted at 29, to the upper part of the frame and adjusted by the hand-lever 30, pivoted near its lower end at 31 and secured in its adjustment by the notches 32 engaging in openings 27$^a$. The purpose of this shield is to direct and regulate the discharge of the grain from the feeder cylinder, upon, or against, the thrashing cylinder as shown by the dotted lines in Fig. 1.

39 is the usual inclined removable feed-board.

33 is an eccentric cam on the shaft 34 embraced by the lugs 35 and block 36, by which a vibratory motion is given to the feed-board.

37 is the thrashing cylinder provided with the spikes 38.

39$^a$ is the concave having the spikes 40.

41 is a belt from the thrashing cylinder to the feeder cylinder, by which motion is given thereto.

42 is a belt from the feeder cylinder pulley 43, to the pulley 44 of the driving shaft 34, by which motion is conveyed through the sprocket chain 17 to the band-cutter.

In the operation of my improved band-cutter and feeder, the grain is carried by the belt 14, between the band-cutter and feeder cylinder; the feeder cylinder running at a higher rate of speed and the band-cutter at a low rate of speed, the band-cutter thus acting as a retarder as the grain is drawn by the feeder cylinder over the band-cutter and the bands are cut by being drawn against the backs of the blades of the band-cutter; the supply of grain passing into the feeder being regulated and limited by the feed plate 20. As it passes through between the feeder cylinder and the band-cutter the grain is thrown against the shield 28, which regulates the fall of the grain and straw upon and against the thrashing cylinder. When the grain is very dry, the shield being set, as shown by the dotted line, to prevent it falling upon the cylinder (thereby cutting the grain) it is directed toward the feed board 32, and thus carried into and against the thrashing cylinder, in case the grain be damp, the shield is set forward so that the grain and straw may fall more directly upon the thrashing cylinder.

Having thus described my invention, the following is what I claim as new therein and desire to secure by Letters Patent:

1. A band-cutter and feeder attachment for a thrashing machine comprising a feeder cylinder run at a high rate of speed, and a band-cutter run at a low rate of speed beneath the feeder cylinder and geared to run in the opposite direction from the feeder cylinder, and to co-act with it cutting the bands and distributing the grain in its passage over the band-cutter and beneath the feeder cylinder to the thrashing cylinder, substantially as shown and described.

2. A band-cutter and feeder attachment for a thrashing machine, comprising a feeder cylinder, a band-cutter of a small diameter geared to run at a low rate of speed beneath the feeder-cylinder, and in the opposite direction from the feeder cylinder and over which the grain passes from the carrier to the thrashing cylinder said band-cutter containing a suitable number of blades, having curved teeth those nearest the feeder cylinder having their concave edges pointing from the thrashing cylinder, substantially as shown and described and for the purposes set forth.

3. A band-cutter and feeder attachment for a thrashing machine comprising a feeder cylinder and a band-cutter located below the feeder cylinder and said feeder cylinder being geared to run at a higher rate of speed and said band-cutter being geared to run at a lower rate of speed and in the opposite direction from the feeder cylinder and acting as a retarder upon the bottom of the bundle as the same is being drawn in by the feeder cylinder over the band cutter, substantially as shown and described.

4. A band cutter and feeder attachment for a thrashing machine comprising a feeder cylinder run at a high rate of speed, a band-cutter located below the feeder cylinder geared to run at a low rate of speed in the opposite direction to the feeder cylinder and working in connection with the feeder cylinder to advance the grain while the feeder cylinder spikes cut the bands against the blades of the band-cutter, a curved feed plate, located to the front and in proximity to the feeder cylinder, to regulate the supply of grain to the feeder cylinder having cog-sectors, a shaft having cog gear engaging the cog sectors and a worm wheel, and a rod having a hand wheel and worm for operating the worm wheel, substantially as shown and described.

5. A band-cutter and feeder attachment for a thrashing machine comprising a feeder cylinder, a band-cutter located beneath the feeder cylinder and against which the bands are cut by the spikes of the feeder cylinder and a thrashing cylinder, a curved shield hinged near the top of the feeder frame, located to the rear of the feeder cylinder, and band-cutter and above the thrashing cylinder, and notched levers, whereby the shield is adjusted, passing through and engaging the rear of the feeder frame, substantially as shown and for the purpose set forth.

6. A band-cutter and feeder attachment for a thrashing machine, comprising a feeder cylinder, a band-cutter located below the feeder cylinder, said feeder cylinder running at a high rate of speed and against which the bands are cut by the spikes of the feeder cylinder, and said band-cutter running at a low rate of speed in the opposite direction to the feeder cylinder, a shield located above the thrashing cylinder, and to the rear of the feeder cylinder, hinged to the feeder frame, and a notched lever, whereby the shield is adjusted, passing through the rear of the feeder frame, substantially as shown and described and for the purposes set forth.

DAVID C. RUTH.

Witnesses:
JOHN S. BECKETT,
MAY FIELDS.